(12) United States Patent
Smiltneek et al.

(10) Patent No.: US 12,467,658 B2
(45) Date of Patent: Nov. 11, 2025

(54) DIFFUSER FOR THERMAL STORAGE TANK

(71) Applicant: A. O. Smith Corporation, Milwaukee, WI (US)

(72) Inventors: Steven Patrick Smiltneek, Smyrna, TN (US); Cade Matthew Guest, Mount Juliet, TN (US); Edward John Karl, Smyrna, TN (US); Gregory Allen Russell, Murfreesboro, TN (US)

(73) Assignee: A. O. Smith Corporation, Milwaukee, WI (US)

( * ) Notice: Subject to any disclaimer, the term of this patent is extended or adjusted under 35 U.S.C. 154(b) by 1019 days.

(21) Appl. No.: 17/096,509

(22) Filed: Nov. 12, 2020

(65) Prior Publication Data
US 2022/0146146 A1    May 12, 2022

(51) Int. Cl.
| | | |
|---|---|---|
| F24H 1/22 | (2022.01) | |
| F24H 1/18 | (2022.01) | |
| F24H 9/00 | (2022.01) | |
| F24H 9/13 | (2022.01) | |
| F28D 20/00 | (2006.01) | |

(52) U.S. Cl.
CPC ..................... F24H 1/22 (2013.01)

(58) Field of Classification Search
CPC . F24H 1/186; F24H 1/22; F24H 9/133; F24H 9/0015; F28D 2020/0069; F28D 20/0039
See application file for complete search history.

(56) References Cited

U.S. PATENT DOCUMENTS

| | | | |
|---|---|---|---|
| 3,447,560 A  * | 6/1969 | Dodson ................... | F24H 1/202 |
| | | | 126/362.1 |
| 3,720,189 A | 3/1973 | Meyers | |
| 4,184,417 A | 1/1980 | Chancellor | |

(Continued)

FOREIGN PATENT DOCUMENTS

| | | |
|---|---|---|
| AU | 710042 B2 | 9/1999 |
| CN | 203396108 U | 1/2014 |
| CN | 203432084 U | 2/2014 |

(Continued)

OTHER PUBLICATIONS

Translation of DE-102007027570-B3, Oct. 2008.*
Translation of DE-19937985-C1, Mar. 2001.*
Merriam-Webster Definition Annular.*

Primary Examiner — Steven S Anderson, II
(74) Attorney, Agent, or Firm — Michael Best & Friedrich LLP

(57) ABSTRACT

A diffuser is provided for use in a thermal storage tank. The diffuser includes a fluid inlet to receive a flow of liquid into the diffuser, and a fluid outlet to discharge the flow of liquid out of the diffuser into an internal volume of the thermal storage tank. A flow circuit extends between the fluid inlet and the fluid outlet. A plurality of flow sections are sequentially arranged along the flow circuit. Each one of the plurality of flow sections defines a cross-sectional flow area for the flow of liquid. The cross-sectional flow area within any one of the plurality of flow sections is greater than the cross-sectional flow area within any of the plurality of flow sections arranged upstream of said one of the plurality of flow sections.

7 Claims, 10 Drawing Sheets

(56) References Cited

U.S. PATENT DOCUMENTS 4,730,098 A    3/1988  Cave

FOREIGN PATENT DOCUMENTS

| | | | |
|---|---|---|---|
| CN | 203501476 U | 3/2014 | |
| CN | 205026949 U | 2/2016 | |
| CN | 106196574 A | 12/2016 | |
| CN | 207438907 U | 6/2018 | |
| DE | 3819317 A1 | 12/1988 | |
| DE | 19937985 C1 * | 3/2001 | ......... F28D 20/0039 |
| DE | 10256542 A1 | 6/2004 | |
| DE | 102007027570 B3 * | 10/2008 | ............ F24H 9/124 |
| GB | 722677 A | 1/1955 | |

* cited by examiner

DIFFUSER FOR THERMAL STORAGE TANK

BACKGROUND

The present invention relates to a diffuser for a thermal storage tank which may, for example, be used as part of, or in conjunction with, a system for heating water.

Thermal storage tanks are used in a hot water system to store water that has been heated prior to a demand for heated water. The use of a thermal storage tank can be beneficial when, for example, the demand for hot water is intermittent. Short duration, high flowrate demands for hot water can be met by heating water over longer durations at slower rates and storing the heated water within one or more thermal storage tanks in order to satisfy the demands as they arise.

A thermal storage tank is loaded or charged with hot water by drawing cold water from the tank's lower portion, flowing the water through a heat engine, heating the water to a desired temperature in the heat engine, and returning the water at the desired temperature to the thermal storage tank through the tank's upper portion. In addition, when hot water is drawn from the upper portion of the thermal storage tank to be used by a user, cold water is discharged into the lower portion of the thermal storage tank to replace the hot water.

A criterion for evaluating the capability of a hot water thermal storage tank is the tank's volume usage efficiency. As the heated water at a desired temperature is drawn from the tank and is replaced with water that is unheated or at a substantially lower temperature, mixing between the stored, heated water and the lower temperature replacement water can occur within the tank. As a result, during a sustained draw of water, the temperature at which the heated water is delivered from the tank will be undesirably reduced. Volume usage efficiency is a measure of the percentage of the tank's total storage capacity that can be delivered as water at a desired temperature during a sustained draw.

Using known techniques, cold water entering the lower portion of a thermal storage tank and hot water returned to the upper portion of the thermal storage tank from a recirculation line are discharged through traditional pipe nipples or other pipe connections. Discharging the cold water into the lower portion and hot water into the upper portion using known techniques leads to a mixing of cold and hot water within the thermal storage tank before the water can gradually stratify in the thermal storage tank during standby.

SUMMARY

A new water diffuser is provided to minimize mixing in the thermal storage tank of cold water entering the lower portion or hot water returned from the heat engine. With minimum mixing, water is significantly stratified between the upper portion and the lower portion of the storage tank. More specifically, water within the upper portion of the tank has a temperature that is uniform and very close to that of water leaving the heat engine; and water within the lower portion has a temperature that is also uniform but much lower than that of water leaving the heat engine. Thus a portion of the thermal storage tank is charged with water at desired temperature and the efficiency of the heat engine can be ensured by the low temperature of inlet water coming from the lower portion of the thermal storage tank.

In one embodiment, the invention provides a diffuser for use in a thermal storage tank. The diffuser includes a fluid inlet to receive a flow of liquid into the diffuser, and a fluid outlet to discharge the flow of liquid out of the diffuser into an internal volume of the thermal storage tank. A flow circuit extends between the fluid inlet and the fluid outlet. A plurality of flow sections are sequentially arranged along the flow circuit. Each one of the plurality of flow sections defines a cross-sectional flow area for the flow of liquid. The cross-sectional flow area within any one of the plurality of flow sections is greater than the cross-sectional flow area within any of the plurality of flow sections arranged upstream of said one of the plurality of flow sections.

In another embodiment, the invention provides a diffuser for use in a thermal storage tank. The diffuser includes a cylindrical inlet pipe to direct a flow of liquid into the diffuser along a first flow direction. The cylindrical inlet pipe defines a first flow section. A second flow section is arranged downstream of the first flow section and fluidly connected thereto to direct the flow of liquid through the diffuser along a second flow direction. The second flow direction is different than the first flow direction. A third flow section is arranged downstream of the second flow section and fluidly connected thereto to direct the flow of liquid through the diffuser along a third flow direction. The third flow direction is different than the second flow direction. A plurality of additional flow sections are sequentially arranged downstream of the third flow section. The third flow section and the plurality of additional flow sections are fluidly connected to one another to direct the flow of liquid through the diffuser alternatingly along the second and the third flow directions. A fluid outlet is arranged downstream of a terminal one of the plurality of additional flow sections and fluidly connected thereto to discharge the flow of liquid out of the diffuser into an internal volume of the thermal storage tank.

In yet another embodiment, the invention provides a method of discharging a thermal storage tank including removing, at a top end of the thermal storage tank, a first flow of liquid from an internal volume of the thermal storage tank at a sustained flow rate. The first flow of liquid is at a first temperature when discharging is initiated. The method also includes receiving a second flow of liquid at a second temperature that is at least 100 degrees Fahrenheit lower than the first temperature into a diffuser arranged at a bottom end of the thermal storage tank at a first kinetic energy state. The method further includes directing the second flow of liquid through a plurality of sequentially arranged flow sections within the diffuser. Each one of the plurality of sequentially arranged flow sections defines a cross-sectional flow area for the second flow of liquid. The cross-sectional flow area of any one of the plurality of flow sections is greater than the cross-sectional flow area of any of the plurality of flow sections arranged upstream of said one of the plurality of flow sections. The method further includes discharging the second flow of liquid from the diffuser into an internal volume of the thermal storage tank at a second kinetic energy state lower than the first kinetic energy state. The first flow of liquid is at a third temperature after a volume of liquid equal to 90% of the internal volume has been discharged by removing the first flow of liquid. The third temperature in degrees Fahrenheit is at least 95% of the first temperature in degrees Fahrenheit.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
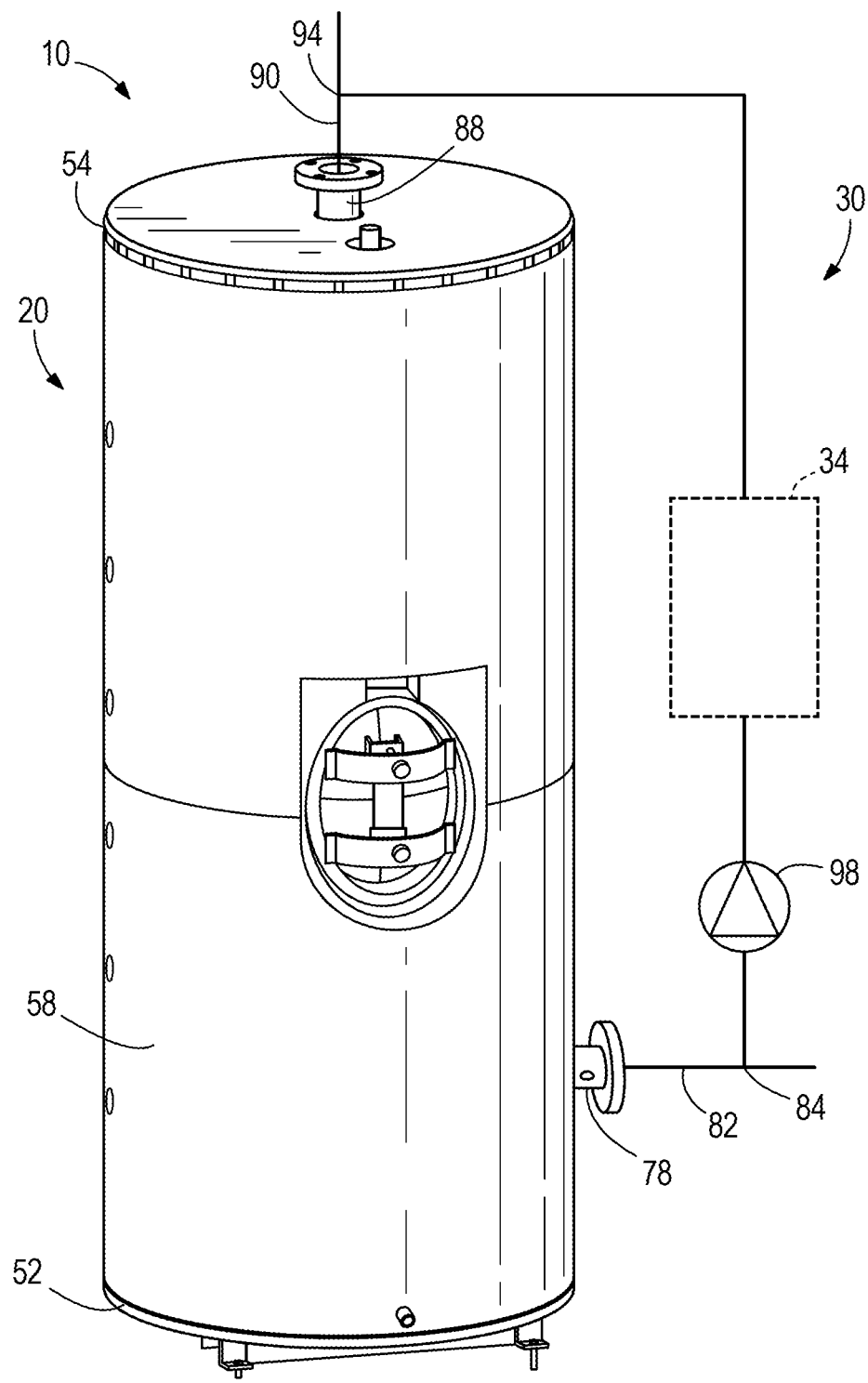
FIG. 1 is a perspective semi-schematic view of a water heater including a thermal storage tank and a heat engine according to the present invention.
Figure 2:
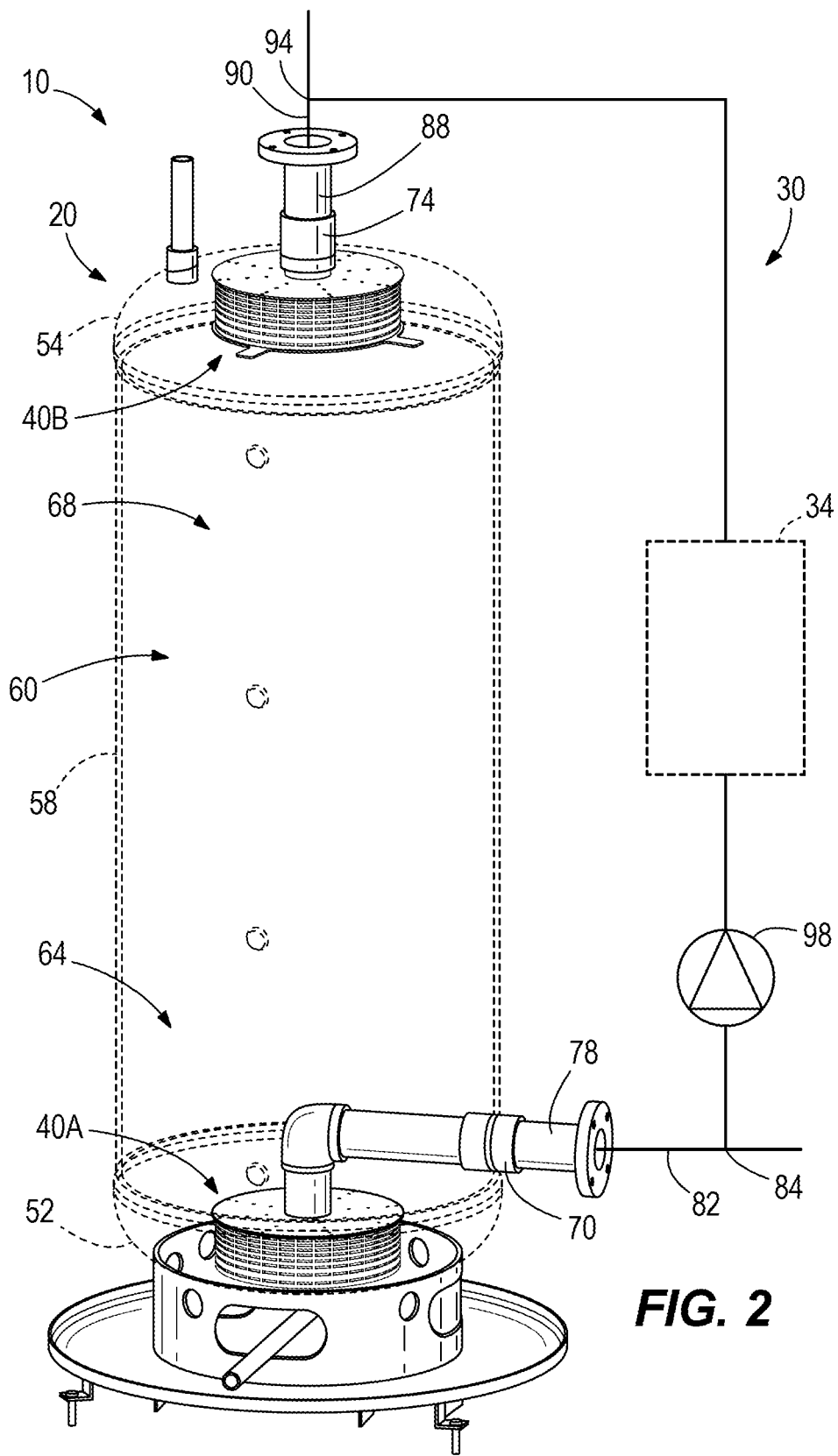
FIG. 2 is a perspective view of the thermal storage tank of FIG. 1, with portions shown as transparent, and illustrating a plurality of diffusers positioned within the thermal storage tank.

Referring to FIGS. 1-2, the present invention provides a water heater 10 including a water storage tank 20 and a heating circuit 30 external to the tank 20. The heating circuit 30 includes a heat engine 34 for heating water for storage in the tank 20. The heat engine 34 can be, for example, a gas-fired tankless water heater, an electric element water heater, a heat-pump water heater, or any other type of boiler or water heater. With additional reference to FIG. 2, the water heater 10 also includes a lower diffuser assembly 40A and an upper diffuser assembly 40B. The lower and upper diffuser assemblies 40A, 40B are positioned at least partially within the tank 20 to control of the delivery of water to the tank 20 and the drawing of water from the tank 20, as will be described in more detail below. In other embodiments, the water heater 10 may only include one of the lower diffuser assembly 40A and upper diffuser assembly 40B.

The tank 20 extends between a first, bottom end 52, and a second, top end 54. The bottom and top ends 52, 54 are sometimes referred to in the art as top and bottom heads. An outer wall 58 extends between the bottom and top ends 52, 54. The tank 20 defines an internal volume 60 therewithin between the bottom and top ends 52, 54 and the outer wall 58. The internal volume 60 includes a lower portion 64 proximate the bottom end 52, and an upper portion 68 proximate the top end 54 of the tank 20. During standby, water in the internal volume 60 naturally stratifies due to the relative densities of hot and cold water, such that the coldest water sinks to the lower portion 64 and the hottest water rises to the upper portion 68. In reality, this stratification defines a gradient from bottom to top of the coolest water to the hottest water. For the purposes of this disclosure, the term "hot" is used to describe all water at or above a useful temperature which is hot enough for the intended use of a user drawing water from the thermal storage tank. The hot water cannot exceed an upper threshold temperature or it may become unusable by the user without being blended with cold water or otherwise having its temperature lowered to make it useable. The term "cold" is used to describe all water that is below the useful temperature. Temperatures of the hot water may be one hundred degrees Fahrenheit or more above the temperatures of incoming cold water.

The tank 20 further includes a cold water connector 70 (FIG. 2) extending horizontally through the outer wall 58 in the lower portion 64 and a hot water connector 74 extending vertically through the top end 54. In other embodiments, the cold water connector 70 may extend vertically through the bottom end 52 and the hot water connector 74 may extend horizontally through the outer wall 58 of the upper portion 68. In other embodiments, both the cold water connector 70 and hot water connector 74 can be horizontal or vertical.

The cold water connector 70 and hot water connector 74 may each be, for example and without limitation, a spud or a pipe nipple. The cold water connector 70 and hot water connector 74 each have threads (internal or external) or another plumbing joining feature. The cold water connector 70 and hot water connector 74 are permanently and water-tightly affixed (e.g., by welding) to the tank 20 to provide a rigid connection point. The lower diffuser assembly 40A is in fluid communication (e.g., through a threaded connection) with the cold water connector 70 and the upper diffuser assembly 40B is in fluid communication (e.g., through a threaded connection) with the hot water connector 74.

A cold water connection pipe 78 is in fluid communication (e.g., by threaded connection) with the cold water connector 70 such that the cold water connection pipe 78 communicates with the lower diffuser assembly 40A. The cold water connection pipe 78 connects to and communicates with a cold water supply line 82 of the building such that cold water from the cold water supply line 82 flows through the cold water connection pipe 78 and cold water connector 70 to the lower diffuser assembly 40A. A cold-side tee 84 places the lower diffuser assembly 40A, cold water connection pipe 78, and cold water supply line 82 in communication with the heat engine 34 as will be described in more detail below. The cold-side tee may take the form of a switch that toggles between placing the lower diffuser assembly 40A and cold water connection pipe 78 in communication with either the cold water supply pipe 78 or the heat engine 34. In this regard, the term "tee" will be used to broadly cover both a basic tee and a switch.

A hot water connection pipe 88 is in fluid communication (e.g., by threaded connection) with the hot water connector 74, such that the hot water connection pipe 88 communicates with the upper diffuser assembly 40B. The hot water connection pipe 88 connects to and communicates with at least one hot water delivery line 90 in the building, such that hot water is drawn from the upper portion 68 through the upper diffuser assembly 40B, hot water connector 74, and hot water connection pipe 88 and delivered to a hot water consuming device for an end user through the hot water delivery line 90. The hot water consuming device may be, for example and without limitation, a faucet, shower, or appliance. A hot-side tee 94 places the upper diffuser assembly 40B, hot water connection pipe 88, and hot water delivery line 90 in communication with the heat engine 34, as will described below. In other embodiments, the hot-side tee 94 may take the form of a switch that toggles between placing the upper diffuser assembly 40B and hot water connection pipe 88 in communication with either the hot water delivery line 90 or the heat engine 34. As noted above, the term "tee" is used broadly to include both a basic tee and a switch.

The heating circuit 30 further includes a pump 98 for moving the water through the heating circuit 30 in order to fill the tank 20 with heated water during a charging event of the thermal storage tank. Cold water from the lower portion 64 of the tank 20 is drawn by the pump 98 through the lower diffuser assembly 40A and cold water line 84 and delivered to the heat engine 34 where the cold water is heated. The pump 98 forces the water through the heat exchanger 34 and returns the heated water to the upper portion 68 of the tank 20 as hot water through the hot water connection pipe 88 and the upper diffuser assembly 40B. The heat engine 34 may be substantially any heat engine (e.g., gas-fired tankless water heater, electric tankless water heater, steam heat exchanger, heat pump) external to the tank 20. In some embodiments, the heating circuit 30 may include multiple pumps 98 and/or heat engines 34 connected in series and/or parallel. Furthermore, in some embodiments, one or more heat engines 34 may be positioned on or within the tank 20 for heating the water within the tank 20. When the water heater 10 is operating with the pump 98 activated and moving water from the lower portion 64 of the internal volume 60, through the heat engine 34, and back to the upper portion 68 of the internal volume 60, the water heater 10 is in a charging mode in which it is increasing the volume of hot water in the internal volume 60.

When there is a call for hot water by the hot water consuming device, the pressure drops in the hot water delivery line 90 (e.g., a faucet is opened by a user such that the hot water delivery line 90 is exposed to atmospheric pressure at the faucet). Cold water from the cold water supply line 82 is at elevated pressure (e.g., some pressure above atmospheric) and consequently pushes into the lower portion 64 of the tank 20 via the cold water supply line 82, cold water connection pipe 78, and lower diffuser assembly 40A to displace hot water from the upper portion 68 of the tank 20 through the upper diffuser assembly 40B, hot water connection pipe 88, hot water delivery line 90, and the hot water consuming device. When the water heater 10 is delivering hot water to the hot water consuming device as described in this paragraph, the water heater 10 is in a discharging mode in which the volume of hot water in the internal volume 60 is decreasing.

The cold water connection pipe 78 and the hot water connection pipe 88 are configured to allow water to flow in a charging direction when the water heater is in the charging mode and in an opposite discharging direction when the water heater is in the discharging mode. As such, the flow of water through the respective diffuser assemblies 40A, 40B may be reversed when switching between the charging and discharging modes. In other embodiments, the tank 20 may include other additional connection ports, separate from the cold water and hot water connectors 70, 74, respectively, for drawing water out of the tank 20 during the discharging mode such that the flow of liquid through the respective diffuser assemblies 40A, 40B is in a single direction into the tank 20. The illustrated diffuser assemblies 40A, 40B have identical diffusers. Multiple embodiments of the diffuser (which can be used in either or both of the lower diffuser assembly 40A and upper diffuser assembly 40B) will now be described.

Figure 3:
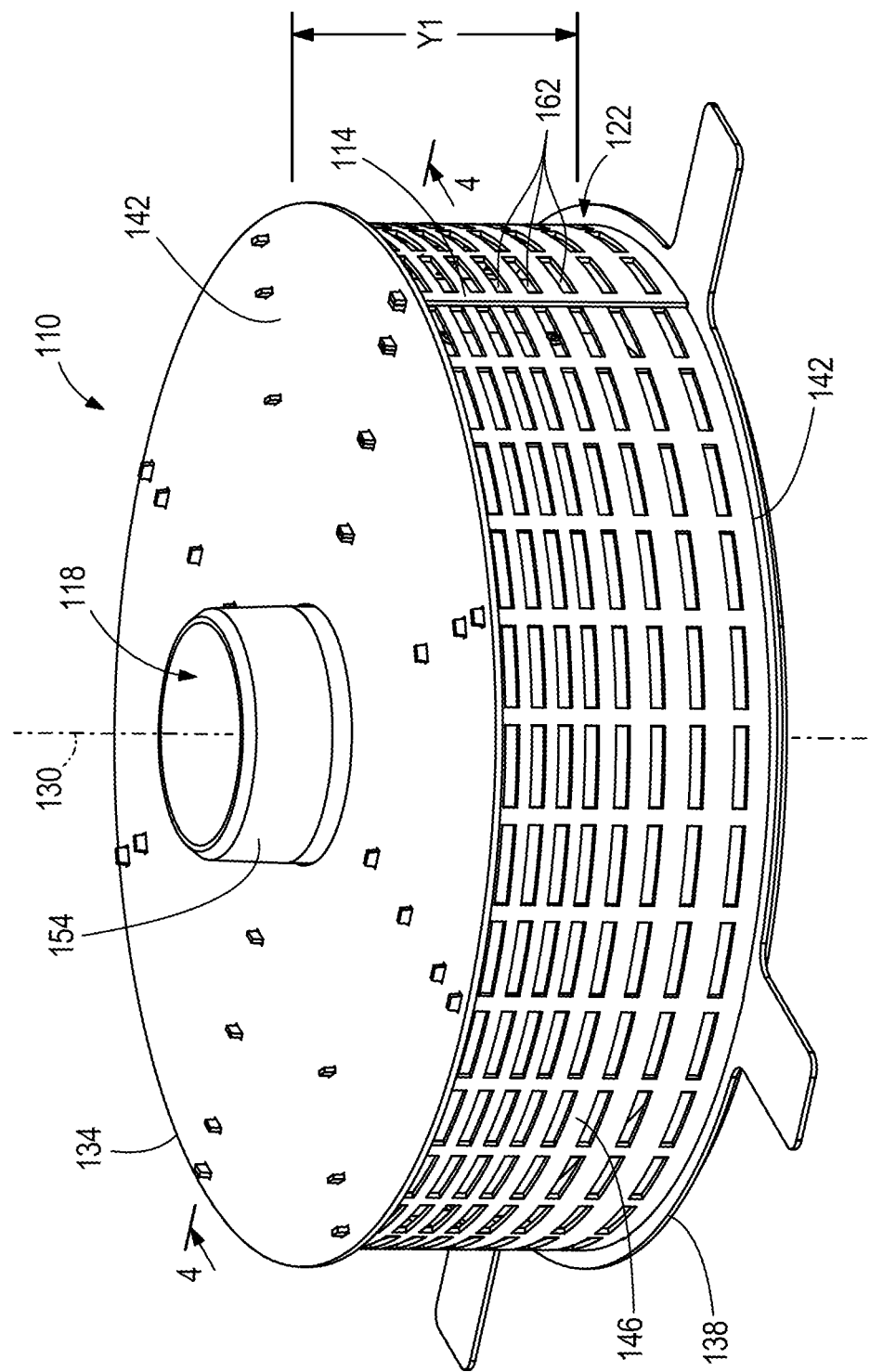
FIG. 3 is a perspective view of a diffuser of FIG. 2 according to a first embodiment.
Figure 4:
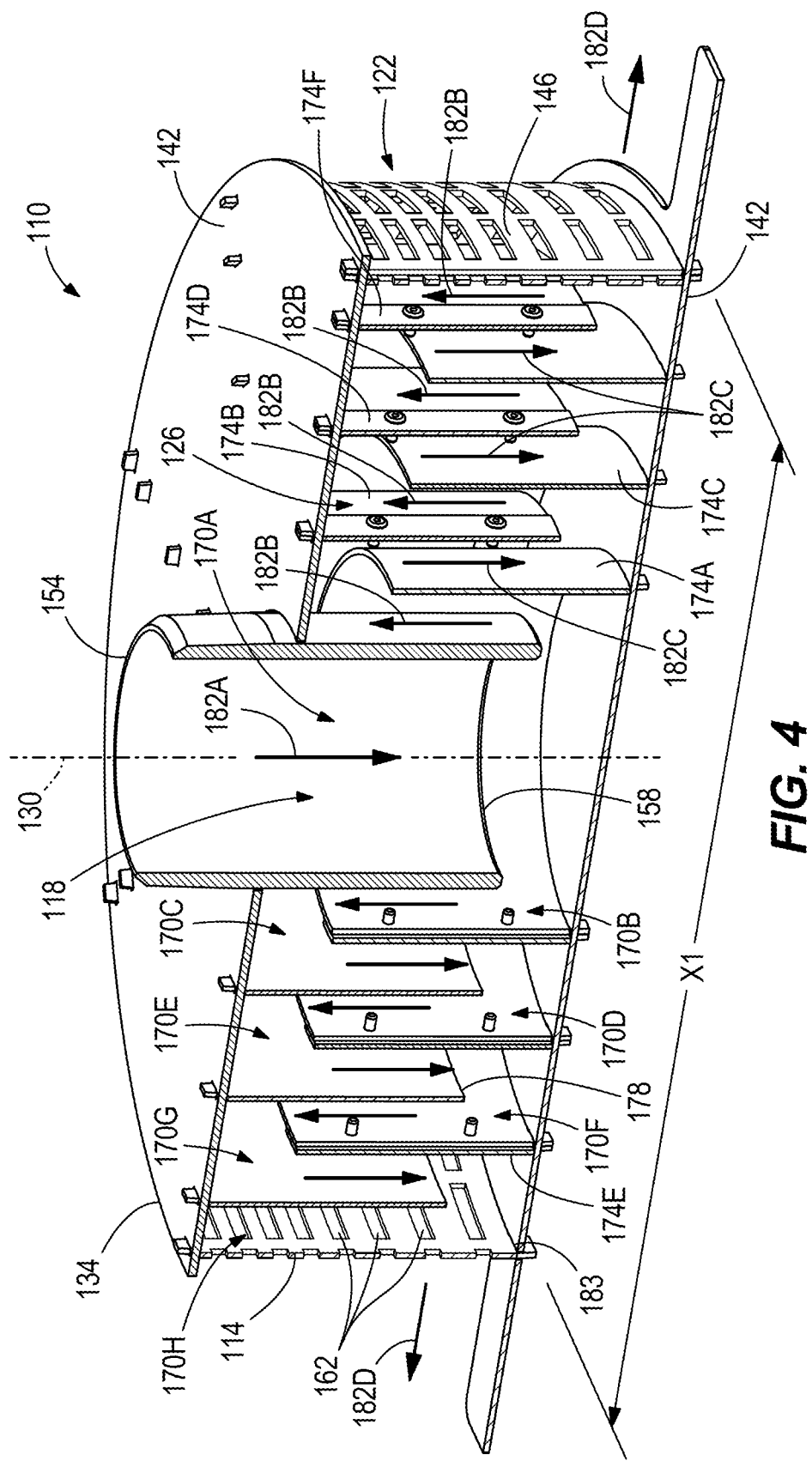
FIG. 4 is a cross-sectional view of the diffuser of FIG. 3.

FIGS. 3-4 illustrate a first example embodiment of a diffuser 110. The diffuser 110 includes a body 114, a fluid inlet 118, and a fluid outlet 122. A flow circuit 126 (FIG. 4) connects the fluid inlet 118 and the fluid outlet 122. The body 114 includes a central axis of symmetry 130 extending therethrough. The flow circuit 126 is positioned within the body 114. Arrows are provided in FIG. 4 to illustrate the general flow direction of the water along the flow circuit 126 in one mode of operation of the diffuser 110. It should be understood however, that in some other mode of operation the flow of water along the flow circuit 126 is reversed from that shown in FIG. 4.

The body 114 extends between a first end 134 and a second end 138. In the illustrated embodiment, the body 114 includes a pair of spaced apart planar walls 142, and a cylindrical outer wall 146 extending between the pair of spaced apart planar walls 142. A first one of the pair of spaced apart planar walls 142 is positioned at the first end 134, and a second one of the pair of spaced apart planar walls 142 is positioned at the second end 138. The pair of spaced apart planar walls 142 and the outer wall 146 define an outer boundary of the diffuser 110.

A height Y1 of the outer boundary of the diffuser 110 is measured between the first end 134 and the second end 138. In the illustrated embodiment, the pair of spaced apart planar walls 142 define the height Y1. In addition, the cylindrical outer wall 146 defines an outer diameter X1 of the outer boundary. In some embodiments, the outer diameter X1 is in the range of two to five times the height Y1 of the diffuser 110. For example, in the illustrated embodiment, the height Y1 is four inches, and the outer diameter X1 is fourteen inches. Accordingly, the outer diameter X1 is 3.5 times the height Y1. A diffuser 110 of such dimensions can be appropriate for a particular size thermal storage tank, for example a thermal storage tank with a water capacity of approximately 200 gallons. In other embodiments, where the diffuser is to be used in a thermal storage tank of greater or lesser capacity, the dimensions of the diffuser may scale up or down in order to be appropriately sized for use in a tank of such capacity, but the ratio between the outer diameter X1 and the height Y1 can be maintained within a desirable range.

With particular reference to FIG. 4, the fluid inlet 118 is fluidly connected to the body 114. The illustrated fluid inlet 118 is provided by a cylindrical inlet pipe 154 extending through the planar wall 142 at the first end 134 of the body 114. An end 158 of the inlet pipe 154 is spaced away from the opposite planar wall 142 positioned at the second end 138 of the body 114. The fluid inlet 118 is configured to receive a flow of liquid into the diffuser 110. More specifically, the fluid inlet 118 is connected to the cold water or hot water connection pipe 78, 88 (e.g., via the cold water connector 70 or hot water connector 74, respectively) to receive water from the cold water supply line 82 or the heat engine 34, respectively.

The fluid outlet 122 of the diffuser 110 fluidly connects the body 114 to the internal volume 60 of the tank 20. The illustrated fluid outlet 122 is provided in the cylindrical outer wall 146. More specifically, the fluid outlet 122 includes a plurality of openings 162 in the cylindrical outer wall 146. The fluid outlet 122 is configured to discharge the flow of liquid out of the diffuser 110 into the internal volume 60 of the tank 20.

The direction of a flow of water into the body 114 of the diffuser 110 through the fluid inlet 118, along the flow circuit 126, and out of the body 114 through the fluid outlet 122 is defined as being a downstream fluid flow direction. An upstream direction is defined as opposite the downstream fluid flow direction.

With continued reference to FIG. 4, the diffuser 110 further includes a plurality of flow sections 170A-170H sequentially arranged along the flow circuit 126 (i.e., relative to the downstream fluid flow direction). In the illustrated embodiment, the diffuser 110 includes a plurality of cylindrical baffles 174A-174F, as well as the cylindrical inlet pipe 154 and the cylindrical outer wall 146, to form the plurality of flow sections 170A-170H within the body 114. More specifically, each one of the plurality of cylindrical baffles 174A-174F fluidly separates two sequentially arranged ones of the plurality of flow sections 170A-170H. In addition, the pair of spaced apart planar walls 142 also partially form each one of the plurality of flow sections 170A-170H. The plurality of flow sections 170A-170H are fluidly connected to each other.

Each of the cylindrical baffles 174A-174F extends from one of the planar walls 142 within the body 114 toward the opposite planar wall 142. In addition, an end 178 of each cylindrical baffle 174A-174F is spaced away from the opposite planar wall 142. Each cylindrical baffle 174A-174F is spaced radially away from the adjacent cylindrical baffles 174A-174F relative to the central axis of symmetry 130. The illustrated plurality of cylindrical baffles 174A-174F alternately extend from the planar wall 142 at the first end 134 and the planar wall 142 at the second end 138 in a radial direction relative to the central axis of symmetry 130.

The illustrated diffuser 110 includes six cylindrical baffles 174A-174F to form seven flow sections 170B-170H. Three of the cylindrical baffles 174A, 174C, 174E extend from the planar wall 142 at the second end 138, and the remaining three cylindrical baffles 174B, 174D, 174F extend from the planar wall 142 at the first end 134. In other embodiments, the diffuser 110 may include fewer or more cylindrical baffles 174A-174F. For example, in some embodiments, the diffuser 110 may include four or more cylindrical baffles 174A-174F. Furthermore, in other embodiments, the baffles 174A-174F may have other shapes such as rectangular, triangular, etc. in which each baffle 174A-174F may have the same or different shape. The diffuser 110 may include fewer or more flow sections 170A-170H based on the number of cylindrical baffles 174A-174F provided.

The cylindrical inlet pipe 154 defines a first flow section 170A of the plurality of flow sections 170A-170H. Accordingly, the illustrated diffuser includes eight flow sections 170A-170H. The subsequent flow sections 170B-170H arranged downstream of the first flow section 170A (e.g., a second flow section 170B, a third flow section 170C, etc.) can be defined by the fluid inlet 118 and a first one of the cylindrical baffles 174A, two of the cylindrical baffles 174A-174F, or a terminal one of the cylindrical baffles 174F and the cylindrical outer wall 146. For example, the second flow section 170B is defined between the cylindrical inlet pipe 154 and the first cylindrical baffle 174A. The third flow section 170C is defined between the first cylindrical baffle 174A and a second cylindrical baffle 174B. The eighth flow section 170H is defined between the sixth, terminal cylindrical baffle 174F and the cylindrical outer wall 146.

Each of the plurality of flow sections 170A-170H are arranged relative to the central axis 130 such that the central axis 130 is a common central axis of symmetry 130 between the flow sections 170A-170H. For example, the illustrated first flow section 170A of the cylindrical inlet pipe 154 is co-axial with the common central axis 130, and the remaining flow sections 170B-170H are co-axially aligned with the cylindrical inlet pipe 154.

Furthermore, each one of the plurality of flow sections 170A-170H has a flow area for the flow of liquid to flow therethrough. The flow area of each flow section 170B-170H is bounded by two or more of the cylindrical baffle(s) 174A-174F, the cylindrical inlet pipe 154, the cylindrical outer wall 146, and/or the planar walls 142. Each flow area has a cross-sectional flow area. In the illustrated embodiment, the cross-sectional flow area within the first flow section 170A is a circular shape. The cross-sectional flow area within each one of the remaining flow sections 170B-170H (e.g., second flow section 170B, eighth flow section 170H, etc.) is an annular shape. While in the exemplary embodiment of FIG. 4 each of the flow sections 170A-170H has a constant cross-sectional flow area over the length of the flow area, in other embodiments the flow area within one or more of the flow sections may be non-constant.

The cross-sectional flow area within any one of the plurality of flow sections 170A-170H is greater than the cross-sectional flow area within any of the plurality of flow sections 170A-170H arranged upstream of said one of the plurality of flow sections 170A-170H. More specifically, each one of the cylindrical baffles 174A-174F is positioned at a predetermined radial position relative to the common central axis of symmetry 130 such that a size of the cross-sectional flow area of each successive flow section 170B-170H increases in the downstream fluid flow direction. In other words, the size of the cross-sectional flow area of the eight flow section 170H is greater than the size of the cross-sectional flow area of the seventh flow section 170G which is greater than the size of the cross-sectional flow area of the sixth flow section 170F, and so on and so forth. Accordingly, the size of the cross-sectional flow area of a terminal one of the flow sections 170A-170H (e.g., the eighth flow section 170H) is greater than the size of the cross-sectional flow area of the remaining flow sections 170A-170H.

Each flow section 170A-170H is arranged to direct the flow of liquid through the diffuser 110 along a predetermined flow direction 182A-182C. More specifically, the cylindrical inlet pipe 154 and the plurality of cylindrical baffles 174A-174F are positioned within the body 114 such that the flow of liquid alternates direction relative to the common central axis of symmetry 130. For example, in the illustrated embodiment, the first flow section 170A is configured to direct the flow of liquid into the diffuser 110 along a first flow direction 182A that is co-axial with the common central axis of symmetry 130. The second flow section 170B is configured to direct the flow of liquid into the diffuser 110 along a second flow direction 182B that is different than the first flow direction 182A. The third flow section 170C is configured to direct the flow of liquid into the diffuser 110 along a third flow direction 182C that is different than the second flow direction 182B. In the illustrated embodiment, the second flow direction 182B is opposite the first flow direction 182A, and the third flow direction 182C is aligned with the first flow direction 182A. Accordingly, the flow sections 170A-170H are arranged such that the flow of liquid through the diffuser 110 alternates along the second and the third flow directions 182B, 182C.

The fluid outlet 122 is configured to direct the flow of liquid along an outlet flow direction 182D. The outlet flow direction 182D may be the same or different than the first flow direction 182A, the second flow direction 182B, and/or the third flow direction 182C. For example, in the illustrated embodiment, the fluid outlet 122 is configured to direct the flow of liquid along the outlet flow direction 182D that is perpendicular to the first flow direction 182A.

In the illustrated embodiment, the openings 162 that define the fluid outlet 122 are non-uniformly spaced along the axial direction Y1. Particularly, those ones of the openings 162 that are located furthest downstream along the flow section 170H (i.e. closest to the first end 143) are spaced more closely to one another than those located furthest upstream in the flow section 170H (i.e. closest to the second end 138). Such a non-uniform spacing can provide for a more even distribution of flow among the plurality of openings 162. In other embodiments, the flow openings 162 can have other spacings, including but not limited to a uniform spacing along the height direction Y1.

While the flow of water is moving, it has a kinetic energy head that is proportional to the square of the bulk velocity of the flow. The flow of liquid received by the fluid inlet 118 has a first kinetic energy state, with a kinetic energy head that is provided by the pump 98 or by pressure from the cold water supply line 82. The flow of liquid being discharged by the fluid outlet 122 has a second kinetic energy state that is substantially lower than the first kinetic energy state as a result of the increased flow area at the fluid outlet 122.

By configuring the size of the cross-sectional flow area of each successive flow section 170B-170H to be greater than the upstream flow sections 170A-170G, the flow of liquid will progressively lose kinetic energy as it flows through the diffuser 110. This results in a generally laminar flow of water into the tank 20, which minimizes turbulence or mixing within the tank 20. In some embodiments, the first kinetic energy state is at least twenty-five times greater than the second kinetic energy state.

As the heated water is delivered to the internal volume 60 during a charging event, it is desirable to avoid or minimize any mixing between the hot water at the upper portion 68 and the cold water at the lower portion 64. As described above, the upper diffuser assembly 40B decreases the kinetic energy head of the heated water flow, that kinetic energy head having been imparted to the heated water flow by the pump 98. By sufficiently decreasing the kinetic energy head of the heated water as it enters the internal volume 60, mixing of the heated water at the upper portion 68 and colder water at the at the lower portion 64 is prevented. By preventing such undesirable mixing, temperature stratification of the water within the internal volume 60 can be achieved, with the heated water and the cold water being separated by a horizontal plane or narrow band that progressively travels vertically downward as the water is heated.

Thermally stratifying the water during the charging event as described above can lead to more efficient heating of the water, as it ensures that the water being delivered to the heat engine 34 by the pump 98 is always the coldest possible water, thus maximizing the rate of heat transfer and heat exchange effectiveness within the heat engine 34. In certain cases, and depending on multiple variables including but not limited to the type of heat engine, the incoming water temperature, and the water set-point temperature, the water can make multiple passes through the heating circuit 30 during the charging event. In some such cases, the temperature difference between the heated water entering through the hot water connector 74 and the water at the lower portion 64 is reduced to the point that the beneficial impact of the diffuser 40B is minimal. Thus, in some embodiments, the upper diffuser assembly 40B is optional.

When the water heater 10 is in a discharging mode, such as when there is a relatively sustained call for heated water by the hot water consuming device, heated water at the upper portion 68 of the tank 20 will be removed via the hot water delivery line 90 and will be replaced by colder water entering the lower portion 64 of the tank 20 via the cold water connection pipe 78. During a sustained draw of hot water, the supply of heated water within the internal volume 60 will eventually be entirely depleted and replaced with unheated water. The length of time required for such a depletion will vary depending on the specific installation of the water heater 10 and the associated plumbing system, as well as the volumetric flow rate at which water is drawn from the tank 20.

During the discharging event, it is highly desirable to prevent or minimize mixing between the heated water and the colder incoming replacement water. By preventing such undesirable mixing, temperature stratification of the water within the internal volume 60 can be achieved during the discharge event, with the heated water and the cold water being separated by a horizontal plane or narrow band that progressively travels vertically upward as the heated water is removed and is replaced by unheated water. In this manner, during a sustained draw the temperature of the water removed through the hot water connector 74 can be held to the storage temperature until nearly the entire volume of heated water is removed from the tank.

The replacement water delivered to the tank 20 through the cold water connection pipe 78 has a first kinetic energy state due to the source pressure of the water system. As the replacement water passes through the lower diffuser assembly 40A, the kinetic energy head will be reduced from the first kinetic energy state to a second, lower kinetic energy state, so that that flow of water out of the diffuser 40A is generally laminar, thereby minimizing the mixing within the tank and creating the desired thermal stratification.

In some embodiments, when the water heater 10 is in the discharging mode, the flow of heated water is removed from the internal volume 60 of the tank 20 at a first temperature, and the flow of replacement water is received in the internal volume 60 of the tank at a second temperature. While the second temperature will generally be lower than the first temperature, the magnitude of the difference between will vary with several factors, such as the setpoint of the water heater and the source of the incoming water. Typically, the second temperature is between fifty degrees Fahrenheit and one hundred and fifty degrees Fahrenheit lower than the first temperature. For example, the second temperature may be at least one hundred degrees Fahrenheit lower than the first temperature.

When a volume of water equal to 90% of the internal volume 60 has been discharged, the flow of water removed from the internal volume 60 is at a third temperature that is close to the first temperature. In some embodiments, the third temperature in degrees Fahrenheit is at least 95% of the first temperature in degrees Fahrenheit when the water is removed from the internal volume 60 of the tank 20.

FIGS. 5-11 illustrate variations on the diffuser 110 illustrated in FIGS. 3-4. Each diffuser 210, 310, 410, 510, 610, of FIGS. 5-11 includes a plurality of flow sections in which a cross-sectional flow area within any one of the plurality of flow sections is greater than the cross-sectional flow area within any of the plurality of flow sections arranged upstream of the said one of the plurality of flow sections.

Figure 5:
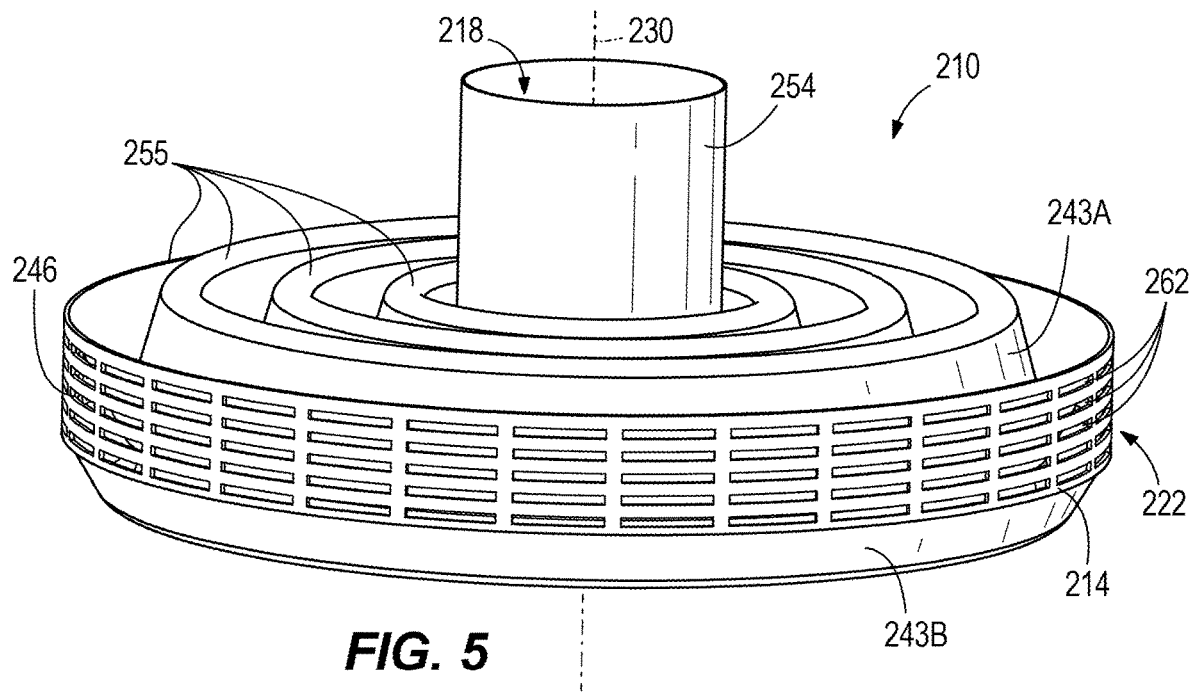
FIG. 5 is a first perspective view of a diffuser according to a second embodiment.
Figure 6:
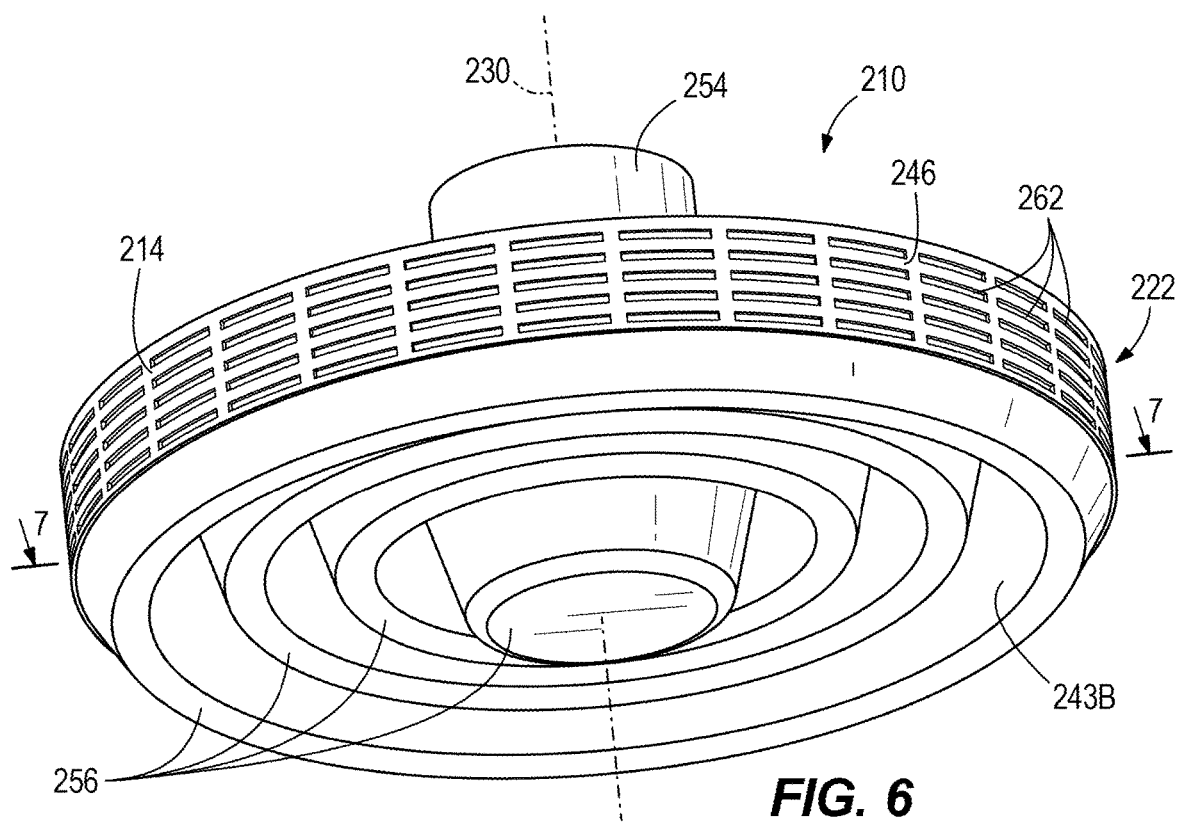
FIG. 6 is a second perspective view of the diffuser of FIG. 5.
Figure 7:
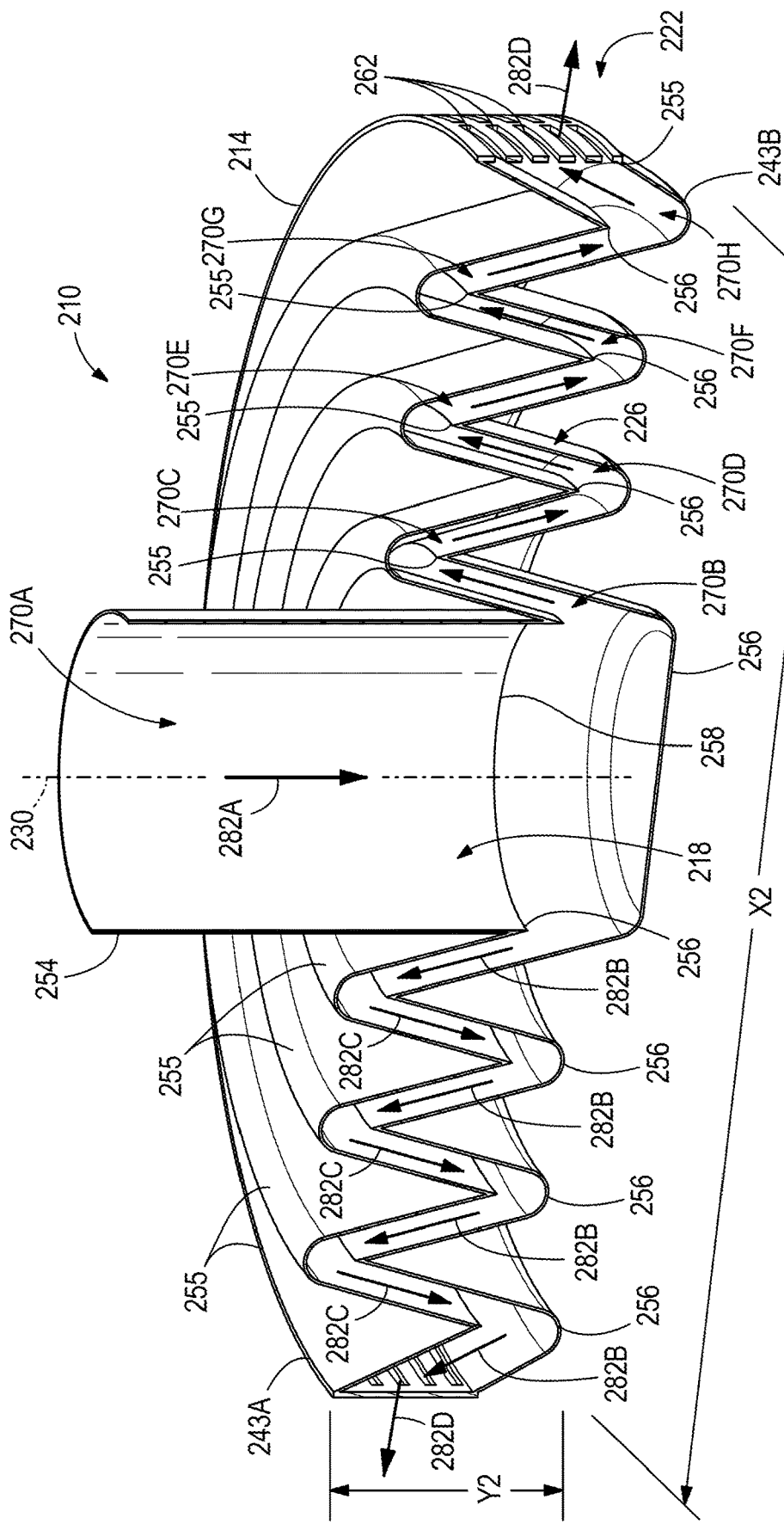
FIG. 7 is a cross-sectional view of the diffuser of FIG. 5.

FIGS. 5-7 illustrate another exemplary embodiment of a diffuser 210, with like components and features as the embodiment of the diffuser 110 shown in FIGS. 3-4 being labeled with like reference numerals plus "100." The diffuser 210 is similar to the diffuser 110 and, accordingly, the discussion of the diffuser 110 above similar applies to the diffuser 210 and is not restated. Rather, only differences between the diffuser 110 and the diffuser 210 are specifically noted herein, such as differences in the construction of the body of the diffuser.

The diffuser 210 includes a body 214, a fluid inlet 218, and a fluid outlet 222. A flow circuit 226 (FIG. 7) is connected between the fluid inlet 218 and the fluid outlet 222. The body 214 includes a central axis of symmetry 230 extending therethrough. The flow circuit 226 is positioned within the body 214.

The body 214 includes a first non-planar wall 243A and a second non-planar wall 243B spaced away from the first non-planar wall 243A. In addition, the second non-planar wall 243B has a shape complimenting a shape of the first non-planar wall 243A. In particular, each of the first and the second non-planar walls 243A, 243B are provided with a series of concentrically arranged circular crests and troughs 255, 256, respectively. Each of the first and second non-planar walls 243A, 243B includes four crests 255 and four troughs 256. The shape of the first and second non-planar walls 243A, 243B may be formed by metal stamping originally flat plate members.

A cylindrical outer wall 246 extends between the first and second non-planar walls 243A, 243B. The first and second non-planar walls 243A, 243B and the outer wall 246 define an outer boundary of the diffuser 210.

A height Y2 of the outer boundary of the diffuser 210 is measured between the farthest axial ends of the first and second non-planar walls 243A, 243B relative to the central axis of symmetry 230 (e.g., the highest crest 255 of the first non-planar wall 243A and the lowest trough 256 of the second non-planar wall 243B). In addition, the cylindrical outer wall 246 defines an outer diameter X2 of the outer boundary.

With particular reference to FIG. 7, the fluid inlet 218 is fluidly connected to the body 214. The illustrated fluid inlet 218 is provided by a cylindrical inlet pipe 254 connected to the first non-planar wall 243A. An end 258 of the inlet pipe 254 is spaced away from the second non-planar wall 243B. The fluid inlet 218 is configured to receive the flow of liquid into the diffuser 210.

The fluid outlet 222 of the diffuser 210 fluidly connects the body 214 to the internal volume 60 of the tank 20. The illustrated fluid outlet 222 is provided in the cylindrical outer wall 246. More specifically, the fluid outlet 222 includes a plurality of openings 262 in the cylindrical outer wall 246. The fluid outlet 222 is configured to discharge the flow of liquid out of the diffuser 210 into the internal volume 60 of the tank 20.

With continued reference to FIG. 7, the diffuser 210 further includes a plurality of flow sections 270A-270H sequentially arranged along the flow circuit 226 (i.e., relative to the downstream fluid flow direction). In the illustrated embodiment, the shape of the first and second non-planar walls 243A, 243B, as well as the fluid inlet 218 and the fluid outlet 222, form the plurality of flow sections 270A-270H. More specifically, the series of concentrically arranged circular crests 255 and troughs 256 of the first and second non-planar walls 243A, 243B provide transitions between adjacent ones of the plurality of flow sections 270A-270H. The plurality of flow sections 270A-270H are fluidly connected to each other. The diffuser 210 may include fewer or more series of concentrically arranged circular crests 255 and troughs 256 such that the diffuser 210 may include fewer or more flow sections 270A-270H.

Similar to the diffuser 110 of FIGS. 3-4, the fluid inlet 218 defines a first flow section 270A of the plurality of flow sections 270A-270H in which the illustrated diffuser 210 includes eight flow sections 270A-270H. Each of the subsequent flow sections 270B-270H arranged downstream of the first flow section 270A (e.g., a second flow section 270B, a third flow section 270C, etc.) are defined by a portion of the first and second non-planar walls 243A, 243B.

Each of the plurality of flow sections 270A-270H are arranged relative to the central axis 230 such that the central axis 230 is a common central axis of symmetry 230 between the flow sections 270A-270H. For example, the illustrated first flow section 270A of the cylindrical inlet pipe 254 is co-axial with the common central axis of symmetry 230, and the remaining flow sections 270B-270H are co-axially aligned with the cylindrical inlet pipe 254.

Furthermore, each one of the plurality of flow sections 270A-270H has a flow area for the flow of liquid to flow therethrough. The flow area of each flow section 270B-270H is bounded by the first and second non-planar walls 243A, 243B. Each flow area has a cross-sectional flow area. In the illustrated embodiment, the cross-sectional flow area within the first flow section 270A is a circular shape. The cross-sectional flow area within each one of the remaining flow sections 270B-270H (e.g., second flow section 270B, eighth flow section 270H, etc.) is a non-planar annular shape.

In contrast to the flow sections 170B-170H of the diffuser 110, each of the flow sections 270B-270H of the diffuser 210 have a non-constant cross-sectional area. The cross-sectional flow area within any one of the plurality of flow sections 270A-270H is, however, greater than the cross-sectional flow area within any of the plurality of flow sections 270A-270H arranged upstream of said one of the plurality of flow sections 270A-270H. In other words, the size of the cross-sectional flow area anywhere along the eighth flow section 270H is greater than the size of the cross-sectional flow area anywhere along the seventh flow section 270G which is greater than the size of the cross-sectional flow area anywhere along the sixth flow section 270F, and so on and so forth. Accordingly, the size of the cross-sectional flow area anywhere along a terminal one of the flow sections 270A-270H (e.g., the eighth flow section 270H) is greater than the size of the cross-sectional flow area anywhere along the remaining flow sections 270A-270H. As a result, the flow area along the flow circuit 226 progressively increases, so that the mean fluid velocity progressively decreases as water flows along the flow circuit 226.

Each flow section 270A-270H is arranged to direct the flow of liquid through the diffuser 210 along a predetermined flow direction 282A-282C. More specifically, the first and second non-planar walls 243A, 243B are positioned relative to each other such that the flow of liquid alternates direction relative to the common central axis of symmetry 230. For example, in the illustrated embodiment, the first flow section 270A is configured to direct the flow of liquid into the diffuser 210 along a first flow direction 282A that is co-axial with the common central axis of symmetry 230. The second flow section 270B is configured to direct the flow of liquid into the diffuser 210 along a second flow direction 82B that is different than the first flow direction 282A. The third flow section 270C is configured to direct the flow of liquid into the diffuser 210 along a third flow direction 282C that is different than the second flow direction 282B. In the illustrated embodiment, the second flow direction 282B and the third flow direction 282C each have an axial component and a radial component. The axial component of the second flow direction 282B is opposite the first flow direction 282A, and the axial component of the third flow direction 282C is aligned with the first flow direction 282A. Accordingly, the flow sections 270A-270H are arranged such that the flow of liquid through the diffuser 210 alternates along the second and the third flow directions 282B, 282C.

The fluid outlet 222 is configured to direct the flow of liquid along an outlet flow direction 282D. The outlet flow direction 282D may be the same or different than the first flow direction 282A, the second flow direction 282B, and/or the third flow direction 282C. For example, in the illustrated embodiment, the fluid outlet 222 is configured to direct the flow of liquid along the outlet flow direction 282D that is perpendicular to the first flow direction 282A.

Figure 8:
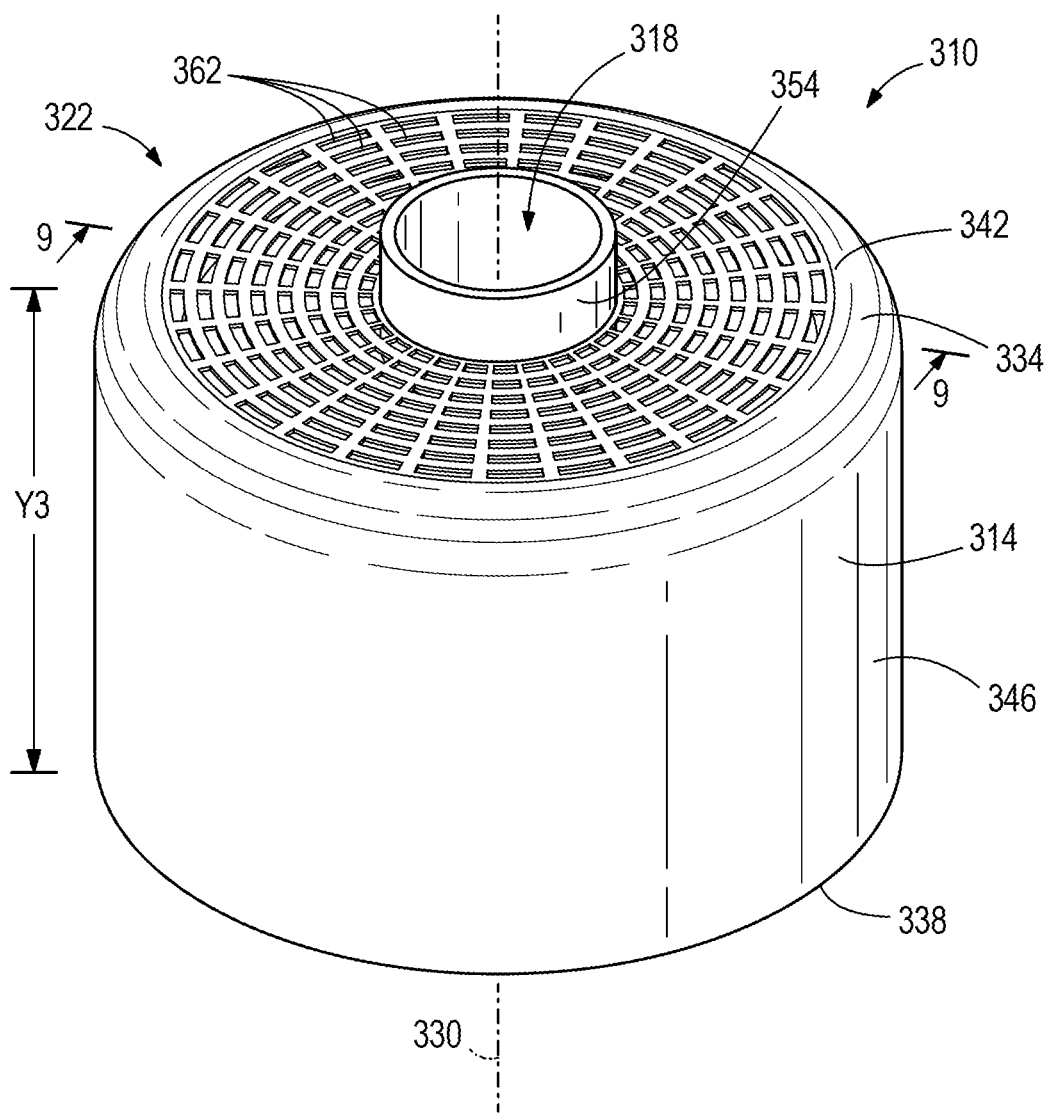
FIG. 8 is a perspective view of a diffuser according to a third embodiment.
Figure 9:
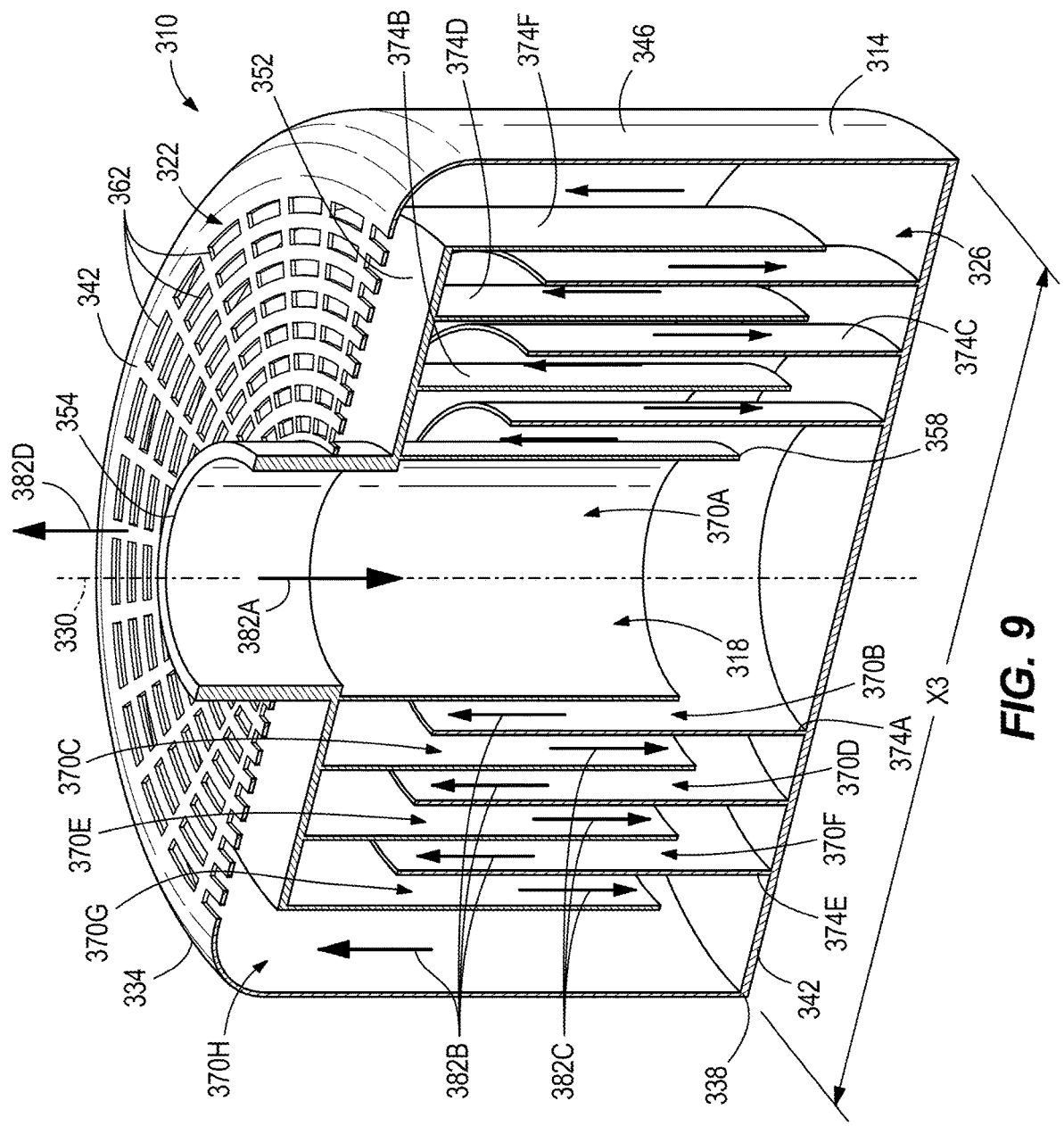
FIG. 9 is a cross-sectional view of the diffuser of FIG. 8.

FIGS. 8-9 illustrate another exemplary embodiment of the diffuser 310, with like components and features as the embodiment of the diffuser 110 shown in FIGS. 3-4 being labeled with like reference numerals plus "200." The diffuser 310 is similar to the diffuser 110 and, accordingly, the discussion of the diffuser 110 above similar applies to the diffuser 310 and is not restated. Rather, only difference between the diffuser 110 and the diffuser 310 are specifically noted herein, such as differences in the baffles and the position of the plurality of openings defining the fluid outlet.

Rather than three of the cylindrical baffles 374B, 374D, 374F extending from the planar wall 342 positioned at the first end 334, the body 314 of the diffuser 310 further includes a plate member 352 positioned within the body 314. Each of the cylindrical baffles 374B, 374D, 374F extend from the plate member 352 toward the opposite planar wall 342, while the cylindrical baffles 374A, 374C, 374E still extend from planar wall 342. In addition, the plate member 352 is spaced axially away from the planar wall 342 relative to the central axis of symmetry 330. As such, it is the plate member 352, not the planar wall 342 positioned at the first end 334, that forms a portion of the flow sections 370B-370G.

Furthermore, rather than the openings 362 of the fluid outlet 322 being positioned on the cylindrical outer wall 346, the openings 362 are positioned on the planar wall 342 positioned at the first end 334. As such, the fluid outlet 322 is configured to direct the flow of liquid along the outlet flow direction 382D that is aligned with the second flow direction 382B. In addition, the openings 362 are of different sizes, and have a uniform spacing in a radial direction relative to the central axis of symmetry 330.

Figure 10A:
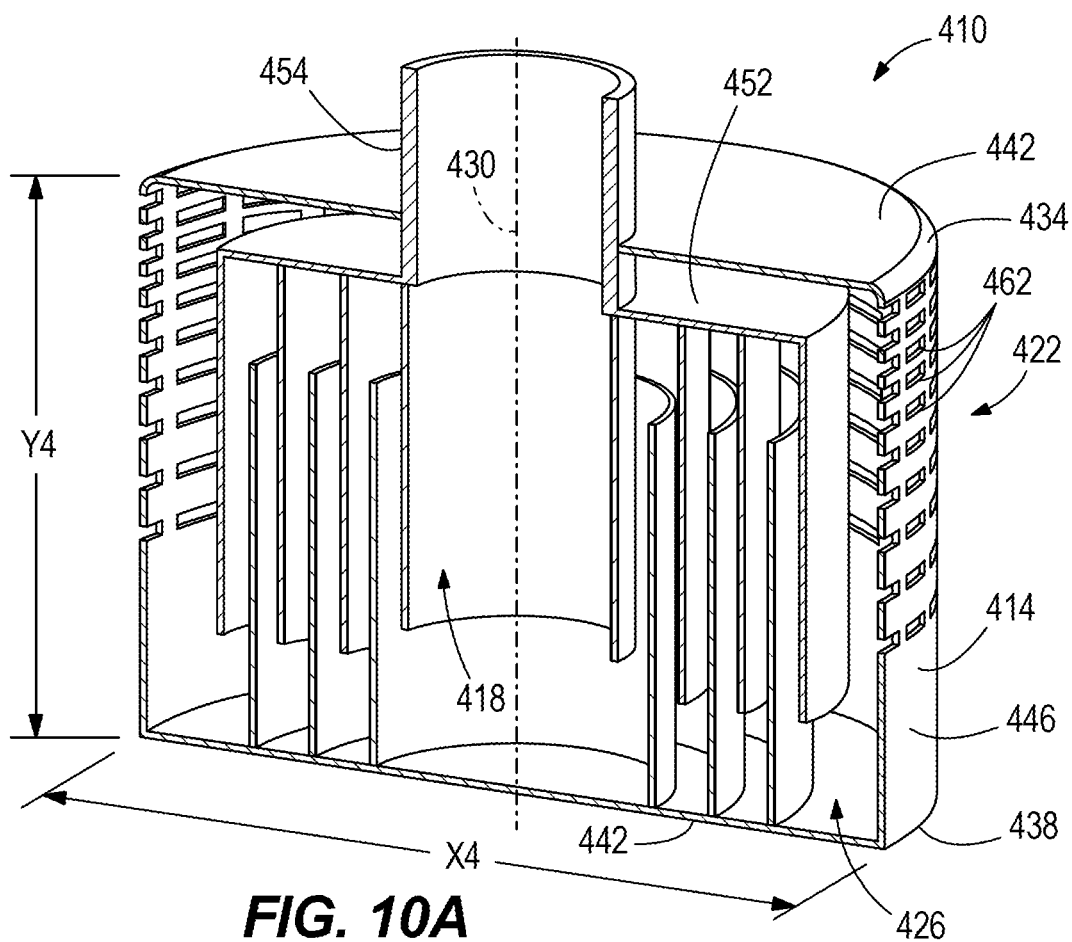
FIG. 10A is a cross-sectional view of a diffuser according to a fourth embodiment.

FIG. 10A illustrates another exemplary embodiment of the diffuser 410 with like components and features as the embodiment of the diffuser 310 shown in FIGS. 8-9 being labeled with like reference numerals plus "300." The diffuser 410 is similar to the diffuser 310 and, accordingly, the discussion of the diffuser 310 above similar applies to the diffuser 410 and is not restated. In particular, the diffuser 410 of FIG. 10A illustrates a different position of the openings 462 on the cylindrical outer wall 446, rather than on the planar wall 342.

Figure 10B:
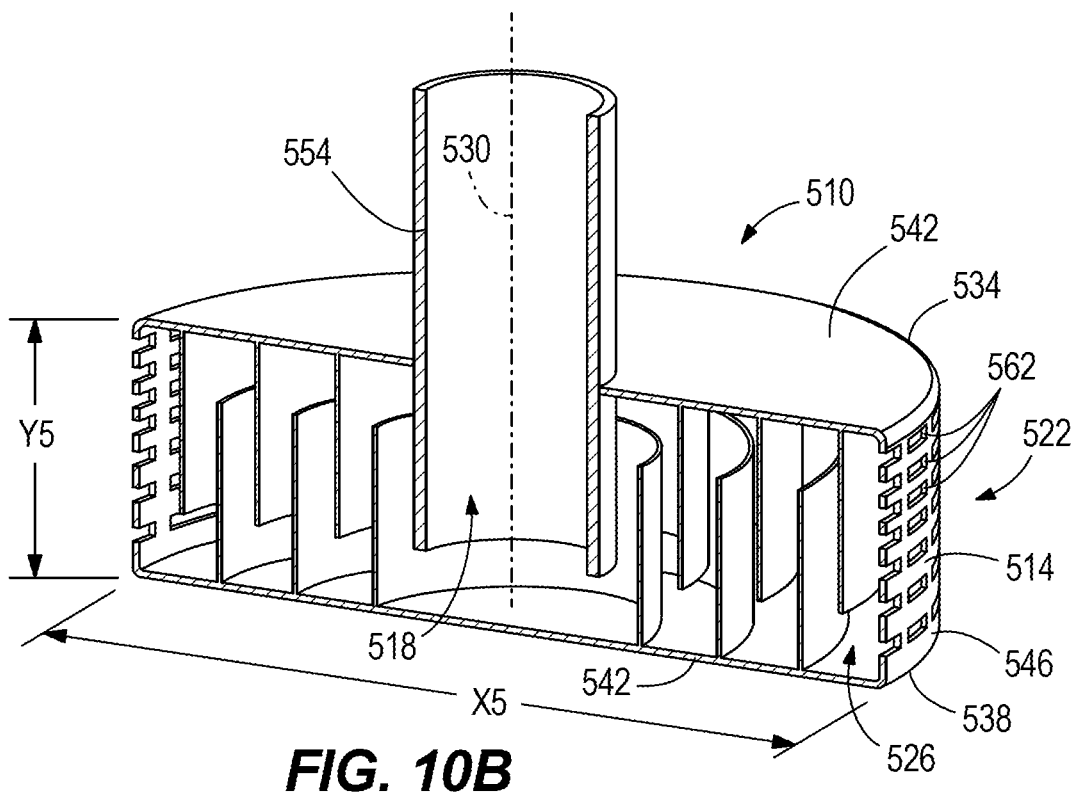
FIG. 10B is a cross-sectional view of a diffuser according to a fifth embodiment.

FIG. 10B illustrates another exemplary embodiment of the diffuser 110 with like components and features as the embodiment of the diffuser 110 shown in FIGS. 3-4 being labeled with like reference numerals plus "400." The diffuser 510 is similar to the diffuser 110 and, accordingly, the discussion of the diffuser 110 above similar applies to the diffuser 110 and is not restated. In particular, the diffuser 510 of FIG. 10B illustrates a variation in height Y5 of the outer boundary of the diffuser 510. The height Y5 of the diffuser 510 is less than the height X1 of the diffuser 110.

Figure 11:
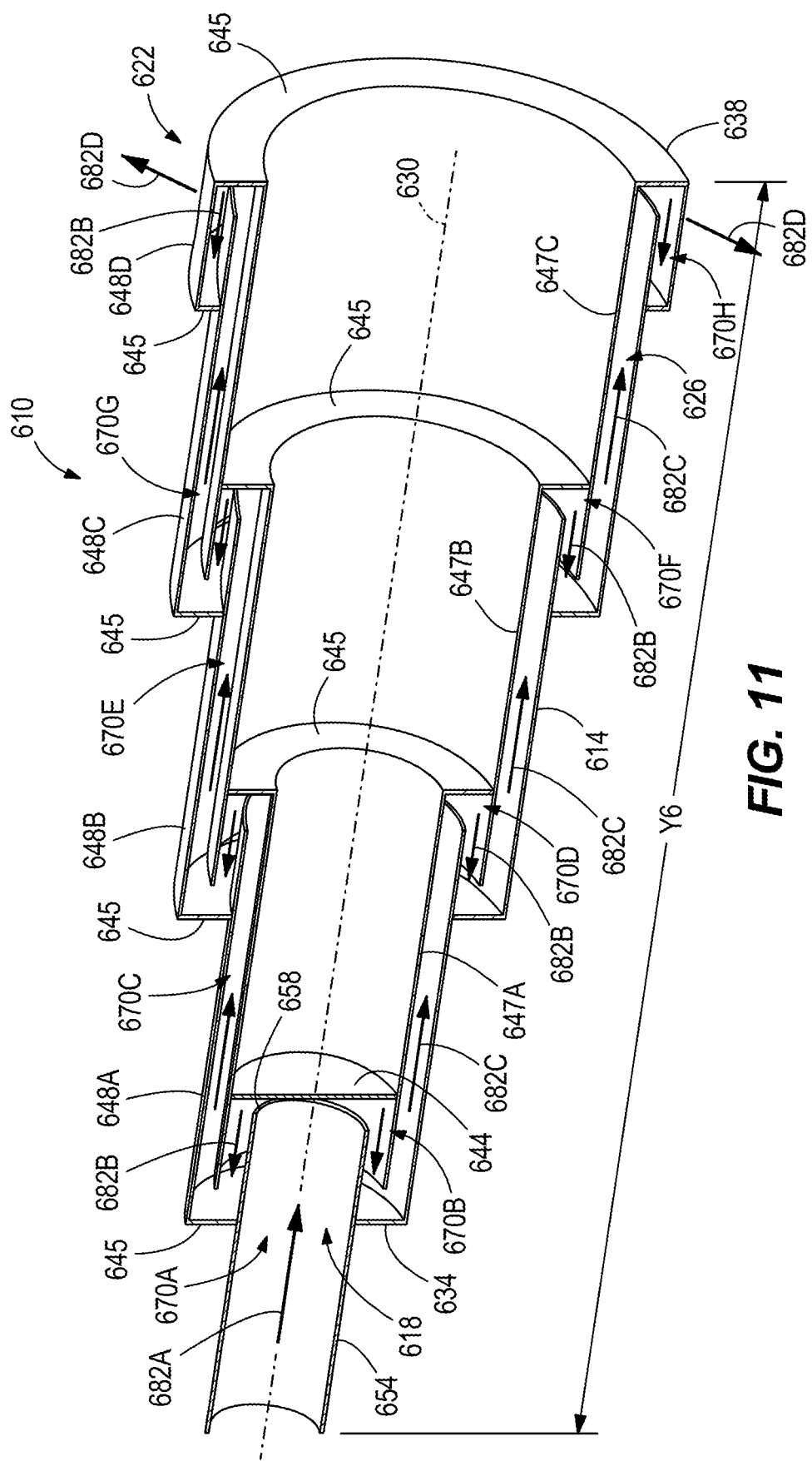
FIG. 11 is a cross-sectional view of a diffuser according to a sixth embodiment.

FIG. 11 illustrates another exemplary embodiment of the diffuser 610, with like components and features as the embodiment of the diffuser 110 shown in FIGS. 3-4 being labeled with like reference numerals plus "500." The diffuser 610 is similar to the diffuser 110 and, accordingly, the discussion of the diffuser 110 above similar applies to the diffuser 610 and is not restated. Rather, only difference between the diffuser 110 and the diffuser 610 are specifically noted herein, such as differences in the construction of the body and the flow sections.

The diffuser 610 includes a body 614, a fluid inlet 618, and a fluid outlet 622. A flow circuit 626 is connected between the fluid inlet 618 and the fluid outlet 622. The body 614 includes a central axis of symmetry 630 extending therethrough. The flow circuit 626 is positioned within the body 614.

The body 614 extends between a first end 634 and a second end 638. In the illustrated embodiment, the body 614 includes a plurality of planar walls 644, 645 spaced apart along the central axis of symmetry. The planar wall 644 has a circular shape, and the planar walls 645 have an annular shape. In addition, the body 614 includes a plurality of cylindrical inner and outer walls 647A-647C, 648A-648D, respectively, extending between the planar walls 644, 645. More specifically, each of the cylindrical inner walls 647A-647C extend from one of the annular planar walls 645 toward another of the annular planar walls 645. Each of the cylindrical outer walls 648A-648D extends from one of the annular planar walls 645 toward another of the annular planar walls 645. Some of the annular planar walls 645 and a portion of each of the outer walls 648A-648D define an outer boundary of the diffuser 610. In addition, the circular planar wall 644, some of the annular planar walls 645, and a portion of each of the cylindrical inner walls 647A-647C define an inner boundary of the diffuser 610. A size (e.g., diameter) of each of the outer boundary and the inner boundary increases from the first end 634 to the second end 638 relative to the downstream fluid flow direction.

A height Y6 of the outer boundary of the diffuser 610 is measured between the first end 634 and the second end 638. In the illustrated embodiment, two of the annular planar walls 645 spaced farthest apart define the height Y6.

The fluid inlet 618 are the fluid outlet 122 are fluidly connected to the body 614. The illustrated fluid inlet 618 is a cylindrical inlet pipe 654 received through the annular planar wall 645 at the first end 634 of the body 614. An end 658 of the fluid inlet 618 is spaced away from the circular planar wall 644. The fluid outlet 622 may be provided in the cylindrical outer wall 648D and/or one of the annular planar walls 645. The fluid outlet 622 may include one or more openings.

The diffuser 610 further includes a plurality of flow sections 670A-670H sequentially arranged along the flow circuit 626 (i.e., relative to the downstream fluid flow direction). In the illustrated embodiment, the plurality of flow sections 670A-670H are formed by the plurality of planar walls 644, 645 and the plurality of cylindrical inner and outer walls 647A-647C, 648A-648D. More specifically, a portion of one of the cylindrical inner walls 647A-647C or a portion of one of the cylindrical outer walls 648A-648D fluidly separates two sequentially arranged ones of the plurality of flow sections 670A-670H. The plurality of flow sections 670A-670H are fluidly connected to each other. The diffuser 610 may include fewer or more annular planar walls 645, cylindrical inner walls 647A-647C, and cylindrical outer walls 648A-648D such that the diffuser 610 may include fewer or more flow sections 670A-670H.

Similar to the diffuser 110 of FIGS. 3-4, the fluid inlet 618 defines a first flow section 670A of the plurality of flow sections 670A-670H in which the illustrated diffuser 610 includes eight flow sections 670A-670H. The subsequent flow sections 670B-670H arranged downstream of the first flow section 670A (e.g., a second flow section 670B, a third flow section 670C, etc.) may be defined by the fluid inlet 618 and a portion of the cylindrical inner wall 647A, one of the cylindrical inner walls 647A-647C and one of the cylindrical outer walls 648A-648D, or a portion of the cylindrical outer wall 648C and the cylindrical outer wall 648D. For example, the second flow section 670B is defined between the cylindrical inlet pipe 654 and a portion of the cylindrical inner wall 647A. The third flow section 670C is defined between the cylindrical inner wall 647A and the cylindrical outer wall 648A. The eighth flow section 670H is defined between the portion of the cylindrical outer wall 648C and the cylindrical outer wall 648D.

Each of the plurality of flow sections 670A-670H are arranged relative to the central axis of symmetry 630 such that the central axis of symmetry 630 is a common central axis of symmetry 630 between the flow sections 670A-670H. For example, the illustrated first flow section 670A of the cylindrical inlet pipe 654 is co-axial with the common central axis of symmetry 630, and the remaining flow sections 670B-670H are co-axially aligned with the cylindrical inlet pipe 654.

Furthermore, each one of the plurality of flow sections 670A-670H has a cross-sectional flow area for the flow of liquid to flow therethrough. In the illustrated embodiment, the cross-sectional flow area within the first flow section 670A is a circular shape. The cross-sectional flow area within each one of the remaining flow sections 670B-670H (e.g., second flow section 670B, eighth flow section 670H, etc.) is an annular shape.

The cross-sectional flow area within any one of the plurality of flow sections 670A-670H is greater than the cross-sectional flow area within any of the plurality of flow sections 670A-670H arranged upstream of said one of the plurality of flow sections 670A-670H. In other words, the size of the cross-sectional flow area of the eighth flow section 670H is greater than the size of the cross-sectional flow area of the seventh flow section 670G which is greater than the size of the cross-sectional flow area of the sixth flow section 670F, and so on and so forth. Accordingly, the size of the cross-sectional flow area of a terminal one of the flow sections 670A-670H (e.g., the eighth flow section 670H) is greater than the size of the cross-sectional flow area of any of the remaining flow sections 670A-670H.

Each flow section 670A-670H is arranged to direct the flow of liquid through the diffuser 610 along a predetermined flow direction 682A-682C. More specifically, the cylindrical inlet pipe 654 and the plurality of cylindrical inner and outer walls 647A-647C, 648A-648D are spaced from the respective planar walls 644, 645 such that the flow of liquid alternates direction relative to the common central axis of symmetry 630. For example, in the illustrated embodiment, the first flow section 670A is configured to direct the flow of liquid into the diffuser 610 along a first flow direction 682A that is co-axial with the common central axis of symmetry 630. The second flow section 670B is configured to direct the flow of liquid into the diffuser 610 along a second flow direction 682B that is different than the first flow direction 682A. The third flow section 670C is configured to direct the flow of liquid into the diffuser 610 along a third flow direction 682C that is different than the second flow direction 682B. In the illustrated embodiment, the second flow direction 682B is opposite the first flow direction 682A, and the third flow direction 682C is aligned with the first flow direction 682A. Accordingly, the flow sections 670A-670H are arranged such that the flow of liquid through the diffuser 610 alternates along the second and the third flow directions 682B, 682C.

The fluid outlet 622 is configured to direct the flow of liquid along an outlet flow direction 682D. The outlet flow direction 682D may be the same or different than the first flow direction 682A, the second flow direction 682B, and/or the third flow direction 682C.

Thus, the invention is to cover all modifications, equivalents, and alternatives falling within the spirit and scope of the invention as defined by the following claims.

What is claimed is:

1. A diffuser for use in a thermal storage tank, comprising:
a cylindrical inlet pipe to direct a flow of liquid into the diffuser along a first flow direction, the cylindrical inlet pipe defining a first flow section;
a second flow section arranged downstream of the first flow section and fluidly connected thereto to direct the entire flow of liquid through the diffuser along a second flow direction, the second flow direction being different than the first flow direction;
a third flow section arranged downstream of the second flow section and fluidly connected thereto to direct the entire flow of liquid through the diffuser along a third flow direction, the third flow direction being different than the second flow direction;
a plurality of additional flow sections sequentially arranged downstream of the third flow section, the third flow section and the plurality of additional flow sections being fluidly connected to one another to direct entire the flow of liquid through the diffuser alternatingly along the second and the third flow directions; and
a fluid outlet arranged downstream of a terminal one of the plurality of additional flow sections and fluidly connected thereto to discharge the flow of liquid out of the diffuser into an internal volume of the thermal storage tank.

2. The diffuser of claim 1, wherein each one of the second flow section, the third flow section, and the plurality of additional flow sections has a cross-sectional flow area that is greater than a cross-sectional flow area of any other one of the flow sections arranged upstream thereof.

3. The diffuser of claim 1, wherein each one of the second flow section, the third flow section, and the plurality of additional flow sections is annular in cross-section and is co-axially aligned with the cylindrical inlet pipe.

4. The diffuser of claim 1, wherein the fluid outlet directs the flow of liquid perpendicularly to the first flow direction.

5. The diffuser of claim 1, wherein the second flow direction is opposite the first flow direction and wherein the third flow direction is aligned with the first flow direction.

6. The diffuser of claim 1, wherein the second flow direction and the third flow direction each have an axial component and a radial component, and wherein the axial component of the second flow direction is opposite the first flow direction and the axial component of the third flow direction is aligned with the first flow direction.

7. The diffuser of claim 1, further comprising a flow barrier adjacent an end of the first flow section to prevent the flow of liquid from continuing along the first flow direction.

* * * * *